United States Patent [19]
Ballas et al.

[11] 3,826,068
[45] July 30, 1974

[54] ROTARY CUTTING ASSEMBLY

[75] Inventors: George C. Ballas, 5146 Richmond Ave., Houston, Tex. 77027; Thomas N. Geist, Houston, Tex.

[73] Assignee: said Ballas by said Geist

[22] Filed: Jan. 8, 1973

[21] Appl. No.: 321,580

Related U.S. Application Data

[63] Continuation-in-part of Ser. No. 207,198, Dec. 13, 1971, Pat. No. 3,708,967.

[52] U.S. Cl. ................................. 56/12.7, 56/295
[51] Int. Cl. ............................................ A01d 55/18
[58] Field of Search ............................ 56/12.7, 295

[56] References Cited
UNITED STATES PATENTS
3,708,967   1/1973   Geist et al............................ 56/12.7

*Primary Examiner*—Antonio F. Guida
*Assistant Examiner*—J. N. Eskovitz
*Attorney, Agent, or Firm*—Bard & Springs

[57] ABSTRACT

Apparatus is provided with a plurality of flexible nonmetallic cutting members for cutting and trimming vegetation, and the like, in a manner to reduce or eliminate the chance of injury or damage to adjacent persons or property. Maximum cutting effectiveness is achieved with a minimum sacrifice of safety by rotating the cutting members at a tip velocity which is a function of the cross sectional diameters.

11 Claims, 11 Drawing Figures

PATENTED JUL 30 1974 3,826,068
SHEET 1 OF 4
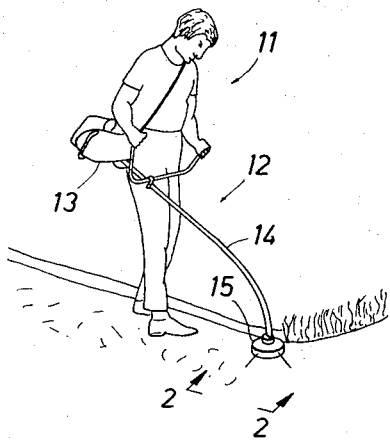
FIG. 1
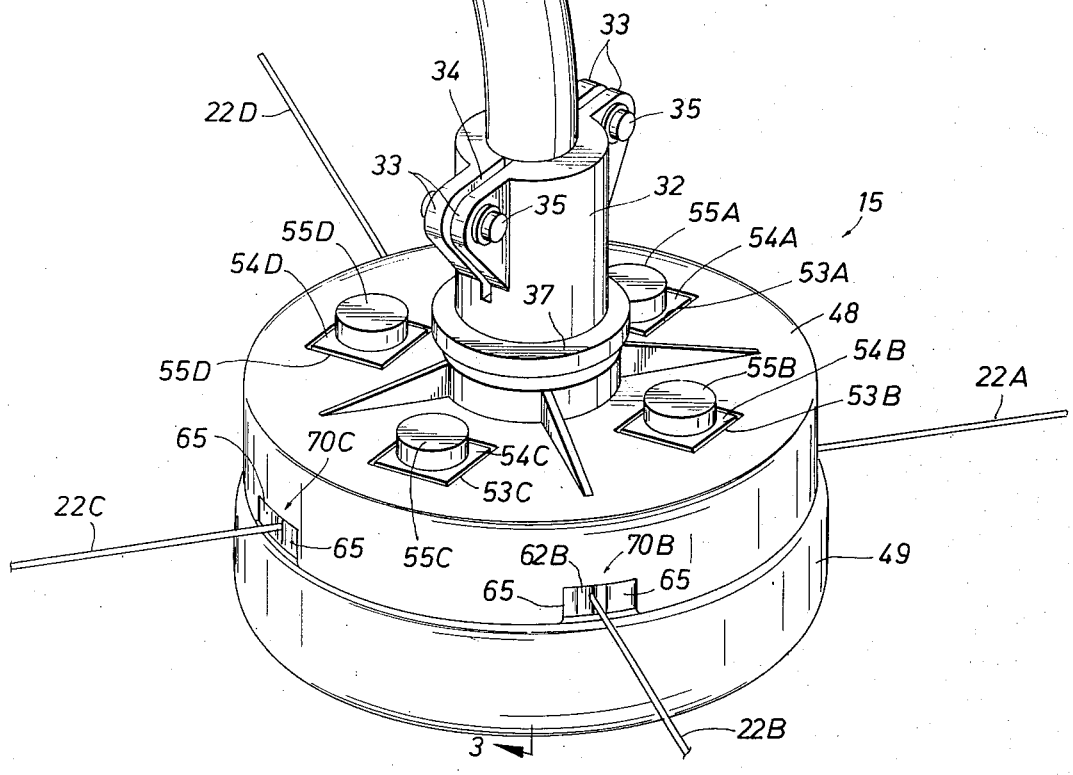
FIG. 2
FIG. 6

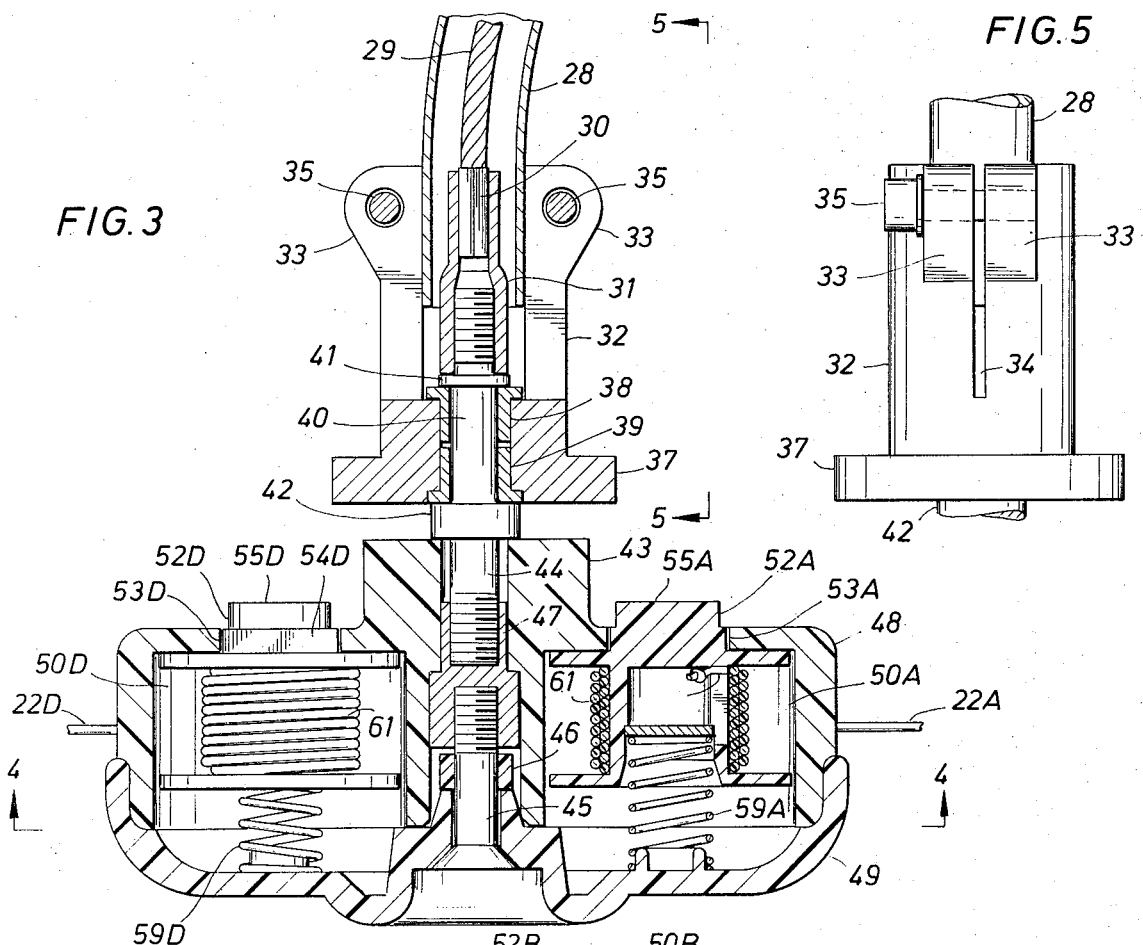
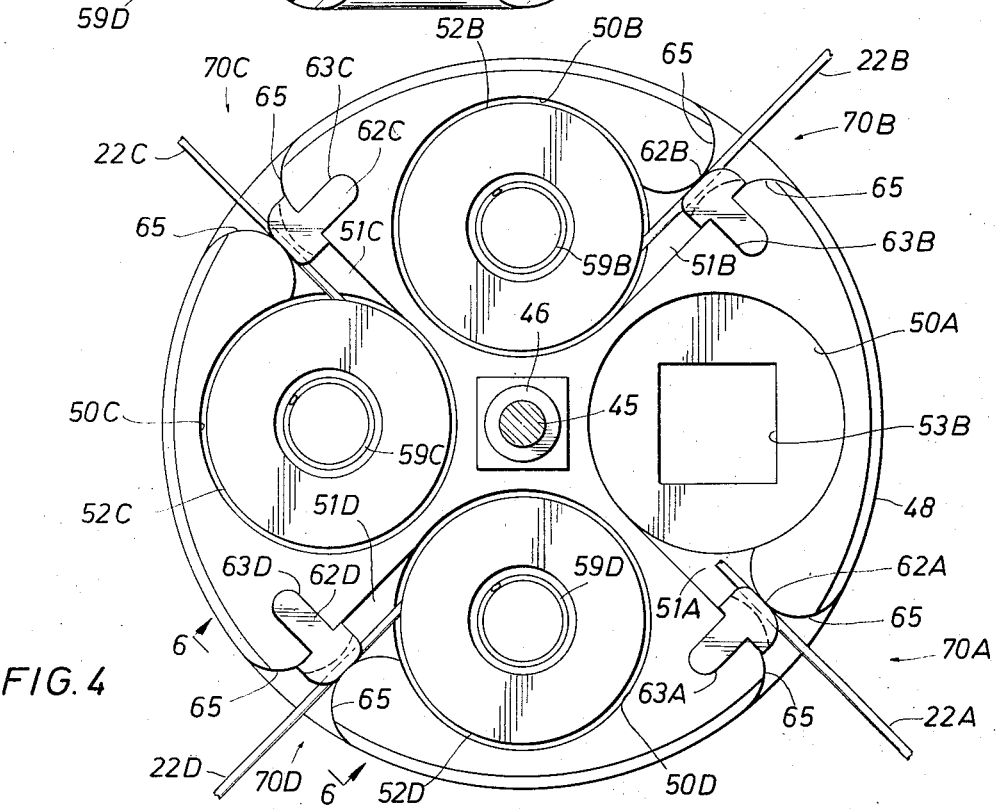

ROTARY CUTTING ASSEMBLY

RELATED PATENT APPLICATIONS

This is a continuation-in-part of a co-pending U.S. patent application Ser. No. 207,198, filed Dec. 13, 1971 and now U.S. Pat. No. 3,708,967.

BACKGROUND OF INVENTION

This invention relates to an improved cutting assembly in the form of a rotary head for a rotary lawn mower, edger, trimmer or the like. The preferred embodiments are in the form of portable hand-held type lawn mowing and edging tools wherein the cutting element is safe in most uses and avoids the hazardous conditions created by prior art devices.

The prior art is prolix with attempts at solutions to provide a safe, efficient, and simply constructed rotary head for rotary lawn mowers, edgers, trimmers and the like. Heretofore, the rotary head, or cutting blade, of rotary lawn mowers, edgers, and the like, have comprised a rotating metal bar or the like which is rotated at sufficient speeds to effect cutting of grass, weeds, or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following West German petty Patents No. 6,919,841, No. 6,919,842, No. 6,919,843, No. 6,919,844, No. 6,938,265 and No. 7,043,648 one or more embodiments of a lawn mowing or trimming device having a disc-like head member arranged to be rotated by an electric motor, and containing a spool which is housed therein in coaxial relationship to the shaft of the motor. A length of flexible non-metallic line is coiled about the spool, whereby its free travelling end extends generally peripherally from the spool and head, and whereby such free travelling end will be swung arcuately about upon actuation of the motor to cut adjacent vegetation in the manner of a flail.

Use of the German device has revealed that, under ideal operating conditions, it will cut or trim grass and other light-weight vegetation with reasonable effectiveness. Furthermore, it possesses the significant advantage that it is much safer to use than the more conventional cutters, in that it does not cause stones or other solid objects to be discharged in the same dangerous manner, and it is almost completely incapable of causing any significant injury to persons or pets struck by the flailing cutting string. In fact, it is a reasonable statement that the German device will actually cut substantially only the vegetation to which it is directed.

On the other hand, the German device is also subject to certain disadvantages of a magnitude such as to severely limit if not destroy its practical value. In the first place, it is largely effective to cut standing light-weight vegetation but is almost completely useless for any other task. In the second place, it will only cut such vegetation if growing relatively sparcely, and it cannot effectively handle even light-weight vegetation if encountered in a rank condition. A more serious disadvantage, however, is that in the German device the cutting string experiences a breakage rate which is so high as to nullify all of its advantages and to keep such a device from having much commercial value.

It will be readily apparent from a consideration of the teachings hereinafter provided that a cutting string which is free from internal flaws or other defects will not usually break except as a result of being struck against or across a relatively immovable object. The cutting string may, of course, be formed of a metal wire or heavy strap in order to provide it with a tensile strength sufficient to resist such impact, but such a string will create substantially the same dangerous conditions which exist when the cutting element is a rigid blade or the like. Thus, the safety advantages which are present with the German device are directly derived from the same design feature which is the reason for excessive string breakage, i.e., the fact that the cutter used by the German device is a light-weight plastic string having a relatively small diameter, and therefore having a relatively poor tensile strength.

These disadvantages of the prior art, and especially the aforementioned German device, are overcome with the present invention, and commercially acceptable embodiments of a vegetation cutter and the like are herein provided which are not only fully capable of cutting vegetation under most operating conditions, but which are also fully capable of other tasks completely beyond the capabilities of the German device, such as cleaning dead leaves, trash and other such debris from along fences, walls, and the trunks or stems of trees and bushes. More particularly, however, the embodiments of the present invention are capable of operation with a much lower breakage rate for their cutting strings, without any sacrifice whatsoever of the safety features and advantages hereinbefore accorded to the aforementioned German cutting device.

SUMMARY OF INVENTION

This invention is for an improved cutting assembly for a rotary lawn mower, edger, trimmer or the like. It includes a body member arranged for rotation about an axis generally perpendicular with or normal to the cutting plane. It preferably includes at least two nonmetallic cutting lines attached to the body member for rotation therewith in the cutting plane, although a single line may be effective for present purposes under proper circumstances. Each line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is at least 20:1. Certain embodiments of the invention include means for detachably securing the line or lines to the body member so that the same may be replaced after wear. Means may also be included with the body member for storing supplies of line in the nonworking condition whereby the effective working length of the line or lines may be lengthened at desired times as the working length becomes shortened during use thereof. Certain embodiments of the invention may have line storage means supported in the body member, which storage means are in the form of spools which are locked from rotation, but which may be released so that additional line may be payed out as the effective working length becomes shortened during use. Another particularly significant feature is that the configuration of the cutting head is such as to prevent angular deformation or "kinking" of the cutting lines, as will hereinafter be explained in detail.

In one particularly ideal embodiment of the present invention, a circular head member is provided which contains four separate spools spaced about the axis of the head. Each spool supports a separate cutting strand or string, which greatly enhances the ability of this device to cut through impacted vegetation and the like, and to permit this embodiment of the invention to perform tasks which are completely beyond the capacity of devices such as that described and depicted in the aforementioned German patents.

It has been discovered that when two or more cutting strands are employed for present purposes, there is serious likelihood that the strands may become entangled with each other and, in such an event, breakage will frequently occur. Even when breakage does not occur, however, the user of the equipment is required to stop work and disentangle the strings, since very little cutting can be accomplished when the cutting strings are entangled about the head assembly.

In the aforementioned embodiment of the present invention, wherein the head assembly is adapted to support four separate cutting strings, this disadvantage is minimized or substantially eliminated by winding each cutting string onto a separate spool and by disposing the four spools radially within the head assembly as hereinbefore mentioned. In addition, however, it is a particular feature of the present invention to provide cutting strings having a length such as to maximize the cutting effectiveness of the apparatus, and also such as to minimize the likelihood of entanglement. Accordingly, in another particularly suitable embodiment of the present invention, a circular head assembly is provided which contains a single spool located concentrically therein in coaxial alignment with the motor shaft, the spool having a single cutting strand centrally wound thereabout so as to present two free travelling ends extending oppositely of each other from the periphery of the head assembly. Alternatively, a pair of two separate strands may be wound about the spool to present the two ends as cutting members extending oppositely of each other from the periphery of the head assembly.

Inasmuch as the proper length of the cutting members is a significant feature of the present invention, it is a feature of the first four-strand embodiment to provide a convenient technique for paying out substantially the proper length of strand in the event breakage occurs. Accordingly, and as will hereinafter be described in detail, the spools are recessed in socket-like compartments within the circular head, whereby a detent effect is achieved to limit rotation of each spool within the head. In the other embodiment, a blade or the like is fixedly mounted adjacent the circular head, whereby rotation of the head will whip each cutting member across the cutting edge of the blade to sever any excess string from its end.

In its broadest concept, any type of motor may be employed for purposes of the present invention to rotate either of the aforementioned two styles of head assemblies. A four-string cutting device has greater cutting capabilities than a two-string cutting device, however, and thus is more desirable for use in larger areas such as golf courses and the like, or in more heavily impacted or overgrown regions. Under such circumstances, a gasoline-powered engine is normally to be preferred over an electric motor for the simple reason that an electric motor will necessitate a cord for connection with a source of electrical power, and in larger or wilder areas the cord will necessarily be too long to be practical.

On the other hand, an electric motor is cheaper and of lighter weight than a gasoline-driven engine and is therefore far more suitable for a cutting device intended to be employed in residential-size plots or areas, and the like, wherein lesser cutting capabilities are normally required. Accordingly, it is a feature to employ an electric motor, for a two-string head assembly, having particular characteristics especially suitable for such purposes.

These and other features and advantages of the present invention will become apparent from the following detailed description, wherein reference is made to the figures in the accompanying drawings.

IN THE DRAWINGS

FIG. 1 is a view showing an operator operating one form of portable apparatus having four cutting strings extending peripherally from a rotating circular head assembly or the like.

FIG. 2 is a pictorial view taken generally along line 2—2 of FIG. 1 showing one embodiment of the head assembly of this invention in a dynamic or rotating condition.

FIG. 3 is a cross sectional view of the apparatus depicted in FIG. 2 but showing the same cutting assembly in the static or nonrotating position.

FIG. 4 is a central vertical sectional view of the apparatus depicted in FIGS. 2 and 3 and depicting means for storing a supply of line which may be paid out in preselected lengths to extend the effective working length of the cutting lines from the periphery of the cutting assembly.

FIG. 5 is a side elevation view along line 5—5 of FIG. 3.

FIG. 6 is a pictorial representation of the portion of the apparatus depicted in FIG. 2 which includes the peripheral aperture through which a cutting line may extend.

DETAILED DESCRIPTION

Figure 7:
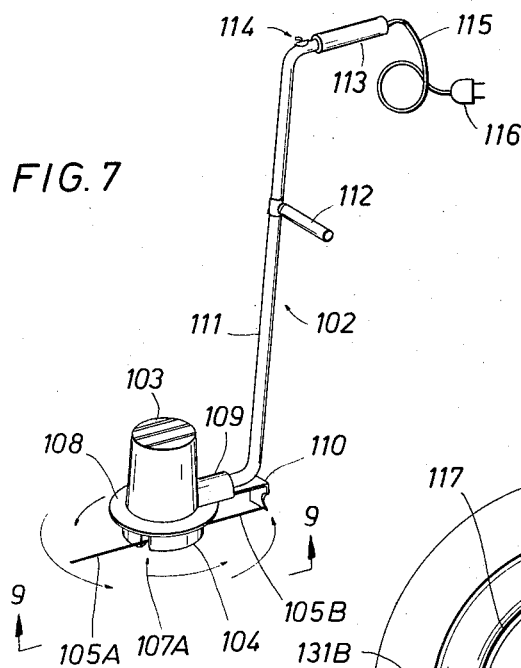
FIG. 7 is a general pictorial view of another different embodiment of the present invention.

Referring now to FIG. 1, an operator 11 is shown carrying a portable type lawn mowing and edging device generally designated by the numeral 12 and which is of the type preferred for heavier tasks or for use in locations where electrical power is not immediately and conveniently available to the operator 11. Accordingly, the apparatus may be composed of a tubular member or casing 14 having a gasoline-powered engine 13 mounted at one end, and having a four-string circular housing or cutting element 15 rotatable at and about the lower end of the casing 14 by suitable drive means such as a flexible cable or shaft (not depicted in FIG. 1) within the casing 14. Such a device 12 is portable, as indicated in FIG. 1, and the cutting plane of the cutting element 15 may be easily arranged to be either horizontal or vertical, or tilted at any angle, to cut along sidewalks, around trees and rocks, and along fences and the like where it is either unsafe or difficult to cut with conventional apparatus, merely by turning or manipulating the casing 14.

Referring now to FIG. 7, there may be seen a pictorial representation of another embodiment of the present invention which is more suitable for use in residential plots and the like. In particular, the depicted cutter 102 may be seen to be at least generally similar to the device 12 illustrated in FIG. 1, in that a hollow casing 111 or the like is provided for use in manipulation within the area to be serviced. The principal difference may be seen to be the fact that, in the cutter 102 depicted in FIG. 7, the apparatus is preferably provided with a two-string circular cutting head 104 which is rotated by the shaft of an electric motor 103 of suitable design mounted at the lower end of the casing 111. As depicted in FIG. 1, the other type of device 12 is preferably suspended from the shoulders of the operator 11 by a sling or the like, since the gasoline-powered engine 13 is relatively heavy. The cutter 102 depicted in FIG. 7 is relatively much lighter and does not require such suspension. Accordingly, it may be easily carried and maneuvered by merely a pair of handles 112 and 113 suitably located on the casing 111.

Referring more particularly to FIG. 7, the cutter 102 may be further seen to include a pair of flexible cutting strands 105A and 105B extending laterally from the cutting head 104 through apertures 107A and 107B of suitable configuration, a distance which is a function of the present invention as will hereinafter be explained. As further indicated, the housing of the electric motor 103 preferably includes a sleeve portion 109, for receiving and accommodating the lower and insertable dog-leg end of the casing 111, and may further have a circular flange portion or bumper 108 for preventing the cutting head 104 from being brought into injurious contact with a wall or tree during its rotation by the motor 103.

Power may be applied to the motor 103 through a conventional electrical-type insulated cord or conductor 115, having an appropriate plug 116 at one end, and having its other end (not depicted) passed through the casing 111 for connection with the motor 103. An appropriate on-off switch 114 may conveniently be located adjacent the handle 113, at the upper end of the casing 111, for interconnection with the conductor 115 and motor 103. In addition, a knife member 110 is preferably attached to the housing of the motor 103 for trimming the cutting strands 105A and 105B to the proper length, as will hereinafter be explained in detail.

Referring now to FIG. 2, there may be seen an enlarged view of the cutting element 15 represented generally in FIG. 1, and more particularly showing how the lower end of the casing 28 houses the lower end of a flexible cable or drive shaft 29, and how the cutting element 15 is composed of a rotary body 48 fixedly secured thereto for circular revolvment about its axis, and a lower cap 49 attached to the rotary body 48 in a manner hereinafter described.

When the engine 13 is inactivated and the rotary body 48 is in a static condition, the four cutting strands or lines 22A–D will tend to limply or flexibly dangle from the equally spaced-apart windows 70A–D to the extent permitted by their inherent characteristics. When the rotary body 48 is rotated at normal operating velocities, however, the lines 22A–D will tend to stand out rigidly (but also yieldably) from the periphery of the rotary body 48 as indicated in FIG. 2.

The cutting lines 22A–D may be composed of a variety of materials, as for example an elastoplastic extrusion which has been stretched to align the molecules axially. An example of such line is a nylon monofilament such as fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting lines 22A–D should preferably have sufficient fatigue, abrasion, and impact resistance to allow reasonable service life. Further, the lines 22A–D should have sufficient tensile strength to allow a reasonable service life, and should have as small a diameter as is consistent with the foregoing parameter so that the sharpest cutting edge is provided for effecting cutting of the grass, weeds, or the like. The lines 22A-D should preferably be as lightweight as possible so that when the line shears or breaks during use and is thrown from the cutter head, it will cause the least damage upon contact with persons or objects.

Effective cutting may be achieved with lines 22A–D formed of a metal, and such lines will also have a greater tensile strength than if formed of nylon or the like. Metallic lines are more subject to breakage because of fatigue, however, and the relatively greater mass of a piece of metal cutting line will cause it to travel like a projectile for a considerable distance. In addition to this dangerous feature, the fact that the greater mass of a metallic line requires a larger heavier engine 13, makes the use of metallic lines 22A–D undesirable for present purposes. On the other hand, the relatively small mass of a line 22 formed, for example, of an extruded nylon monofilament, creates complex design problems which must be effectively solved to achieve effective cutting, and this will become even more apparent when it is appreciated that only the last one full inch or so, of each of the lines 22A–D, is actually impacted against the vegetation sought to be cut.

It has been empirically determined that there is a functional relationship between the weight of the tip (outer one inch) of a cutting line 22, its cross sectional diameter, its swing radius, and the arcuate velocity of the line 22 at its tip. Thus, an effective length-to-diameter ratio for a nylon monofilament line or the like will usually be greater than 30:1, and it has been found for purposes of the apparatus depicted in FIGS. 1 and 2, that the best cutting lines for the purposes of this invention are extruded nylon line, such as fishing line, having a diameter of about .062 inches for cutting grass and about .125 inches for cutting weeds.

Although the aforesaid cutting lines are essentially limp and not self-supporting while in the static condition, they become rigid and taut under dynamic conditions of rotation, as shown in FIG. 2. The normal rotating speed is on the order of 3000–4000 rpms. During rotation of the cutting lines in the dynamic condition, the cutting lines are caused to become taut and thereby increase the apparent rigidity of the line. These effects are caused by both the rotational speed and the tip speed of the cutting element.

Referring now to FIGS. 2–6, it may be seen that the lower end of the drive shaft 29 in the casing 28 is provided with a square end 30, which is arranged for insertion into a coupling 31 for rotation therewith. Coupling 31 is arranged for rotation in a power head generally designated by the numeral 32, which is arranged for attachment to the lower end of casing 29 as shown. These attaching means take the form of two oppositely spaced apart lobes 33 having screw holes therethrough and in which are mounted a pair of clamping screws 35. In addition, power head 32 is provided with a longitudinal slot 34 intermediate each of lobes 33 such that, upon tightening of clamping screws 35, power head 32 is frictionally attached to casing 28.

The lower end of power head 32 may be provided with an enlarged flange 37 thereabout and with a central aperture therethrough in which is press-mounted a pair of bushings 38 and 39.

The lower end of coupling 31 is arranged for threading engagement with a rigid drive shaft 40 which extends downwardly therefrom and is spaced from the lower end of coupling 31 by thrust washer 41. Shaft 30 extends downwardly through bushings 38 and 39 and is provided with an enlarged portion 42 which acts as a thrust bearing against lower bushing 39 and attached to the lower end thereof a thrust flange 43 and a lower extending portion 44 which extends downwardly therefrom and is arranged for threading engagement with metal insert 47 embedded in a rotary body 48. The body 48 may be of either plastic or metal and is arranged for rotation by shaft 40 and is provided with cutting lines 22A–D, which are to be described hereinafter.

Rotary body 48 is provided with cap 49 which is arranged for fitting about the bottom portion thereof and extending up about the sides thereof a substantial distance. Rotary body 48 is arranged for demounting from casing 28 by loosening clamping screws 35, which permits removal of power head 32 from casing 28 and separation of drive shaft 29 from coupling 31. Thereafter, shaft 40 can be removed from coupling 31 and power head 32 and, subsequently, unthreaded from rotary body 48, which permits removal of cap 49 and access to the interior of rotary body 48. However, it will also be noted that cap 49 is locked to the rotary body 48 by a bolt 45, which is threadedly connectable to the lower threaded end of the insert 47, and which is secured in the cap 49 by a rotatable bushing 46.

Body 48 is provided with a plurality of means for storing a supply of cutting lines therein, which cutting lines are arranged for paying out at predetermined times to vary the effective working lengths of the cutting lines.

Accordingly, body 48 is provided with a plurality of compartments 50A–50D, each of which is spaced in a quadrant of rotary body 48 as shown in FIG. 4. Each of spool openings 50A–D is connected with one of a corresponding plurality of line exit channels 51A–D leading outwardly to the periphery of rotary body 48 as shown. The outward ends of exit channels 51A–D form windows 70A–D having sidewalls 65 curved or otherwise streamlined so as to provide a minimum of stress on the cutting lines 22A–D which are extended radially outwardly therethrough.

As indicated in FIGS. 2–4, each of the spools 52A–D are positioned on each of a corresponding plurality of thrust springs 59A–D, which are appropriately secured to the inside surface or face of the cap 49, and which have their upper ends inserted into lower coaxial apertures in the spools 52A–D. The upper ends of the spools 52A–D may be formed in the manner of square or non-circular protrusions 54A–D non-rotatably inserted upwardly through apertures 53A–D of corresponding shape, and surmounted by knobs 55A–D.

In addition, each of spools 52A–D have wound thereon a supply 61 of cutting lines 22A–D of the aforesaid type, with the inward end projecting through an opening 60 provided in spools 52A–D through which one end of each of the cutting lines 22A–D may be threaded and knotted as shown on the left side of FIG. 6. There is thus provided a supply 61 of cutting lines 22A–D on each of spools 52A–D. The opposite end of each of cutting lines 22A–D is arranged for paying out through a line exit channel 51 leading to and terminating in a window 70 as shown in FIG. 4. Each of line exit channels 51 is provided with elastomeric line retainers 62A–D which may be press fitted in slots 63A–D such that line retainers 62A–D constantly bear against the protruding end of each of cutting lines 22A–D. The resistance exerted by line retainers 62A–D is such that they can be overcome by pulling on lines 22A–D.

The advantages of this arrangement will become immediately apparent when it is recognized that the thrust springs 59A–D will normally thrust the spools 52A–D upwardly within the compartments 50A–D within the rotary body 48, whereby the non-circular portions or protrusions 54A–D will be inserted upwardly through the apertures 53A–D in the body 48. When in this position, the spools 52A–D cannot be rotated within their respective compartments 52A, and this will limit the length of the lines 22A–D extending from the periphery of the body 48. If, for example, the line 22A needs to be extended, however, finger pressure on knob 55A will push the spool 52A down to disengage the protrusion 54A from the rectangular aperture 53A, whereby the spool 52A may then be conveniently rotated within the compartment 50A to pay out more line 22A. When the knob 55A is released, the spring 59A will return the protrusion 54A to the aperture 53A, whereby the spool 52A cannot thereafter be rotated.

Although the shape of the protrusions 54A-D and apertures 53A-D is illustrated as square, it will be noted that they may be provided with any non-circular configuration suitable for present purposes, except that such configuration is preferably that of an equi-lateral polygon such as a pentagon or hexagon. Thus, the spools 52A-D may then be rotated to pay out their respective lines 22A-D in equal segments of substantially predetermined length preferably functionally related to the operation of the depicted apparatus.

For the purpose of further clarity, FIG. 4 is shown with three spools 52A and C-D properly disposed within their respective compartments 50A and C-D in the rotary body 48, but with the fourth spool 52B omitted from the compartment 50B. Thus, the circular configuration of the compartments 50A-D will be clearly apparent, as well as the non-circular configuration of the apertures 50B.

In operation, the apparatus of the FIGS. 1-6 embodiment is assembled in the condition shown in FIG. 2, with cutting line 22A-D extending generally radially outwardly therefrom to the desired lengths. Thereafter, rotary body 48 is rotated by rotation of shaft 29 to the desired rotational speed. As a result, lines 22A-D will be extended radially outwardly from body 48 within its cutting plane, where cutting, lawn edging, or the like may be effected. As lines 22A-D become shortened through use, they can thereafter be restored to their original cutting length by terminating rotation of rotary body 48, pressing down on the knobs 55A-D of each of spools 52A-D, and pulling on lines 22A-D to extend them as desired. Thereafter, pressure is relieved on each of the knobs 55A-D and thrust springs 59A-D urge the spools 52A-D back to the lock position, at which point cutting operations can be continued.

It will thus be apparent that this invention provides the art with an apparatus which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for the operator in that the hazardous conditions prevalent in prior art apparatus has been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting element acts in a resilient fashion in such a manner as not to impart sufficient force to such articles to become missiles; or if they are thrown, it is at a very low velocity relative to prior state of the art machines. Experience has shown that in operating an apparatus of this device with lines of the type described, the cutting lines may accidentially come in contact with the operator's shoes, articles of clothing, or the like, without serious injury as would be the case with prior art devices. Further, in the event a portion of the cutting line is thrown from the apparatus, such thrown portions possess low mass and low kinetic energy and, therefore, quickly loses velocity and energy, thus rendering the same virtually harmless.

Figure 9:
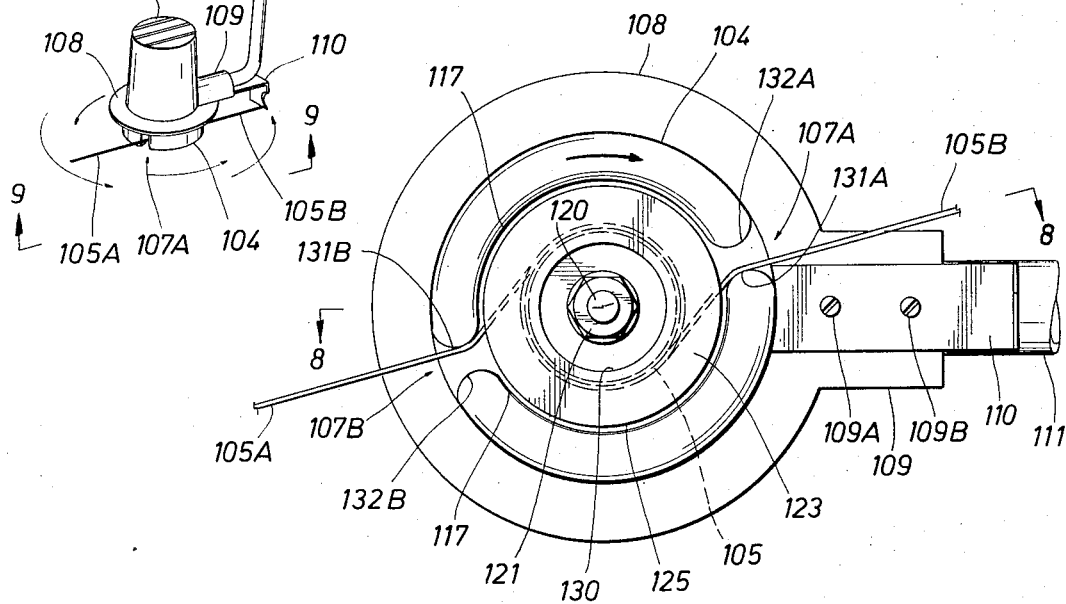
FIG. 9 is a bottom view of the apparatus depicted in FIG. 8.
Figure 8:
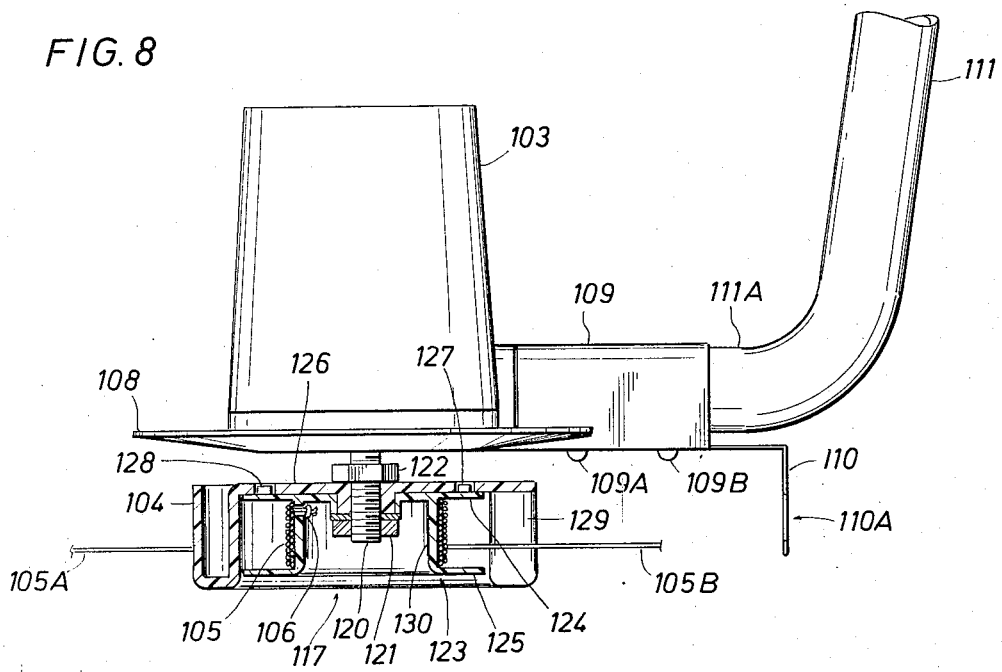
FIG. 8 is a side view, partly in cross section, of a portion of the apparatus depicted in FIG. 7.

Referring now to the embodiment of the invention depicted in FIG. 7, and more particularly to the detailed representations contained in FIGS. 8-9, it may be seen that the rotary body 104 may in this instance be a cup-shaped member centrally secured to the threaded end of the motor shaft 120, and properly spaced from the lower side of the dish-like bumper 108 by lock nuts 121 and 122. Thus, a single spool compartment 117 is provided which is readily accessible, since the spool 123 may be removed by merely disengaging the lower lock nut 121.

It may be clearly seen in FIG. 9 that preferably there are two separate cutting lines 105A and B extending in opposite directions from the body of the spool 123, and each through its respective one of the two gaps or windows 107A and B. In the modification therein depicted, adjacent ends of the two lines 105A and B are inserted through an aperture 106 in the spool 123, and then knotted together to prevent disengagement therefrom. The lines 105A and B are then preferably wound together about the spool 123, oppositely of the direction of rotation of the spool 123 and body 104, until they are separated to extend through their respective windows 107A and B, as hereinbefore stated.

Referring again to FIGS. 8 and 9, it may be seen that the gooseneck lower end 111A of the casing 111 is releasably secured in the sleeve 109 by a pair of lock screws 109A and B which, in turn, serve to further secure the knife 110 to the underneath side of the sleeve 109 in the proper position to trim the lines 105A and B to the proper length. More particularly, it will be noted that the cutting edge 110A of the knife 110 is positioned to intersect and clip the lines 105A and B as they are revolved in the cutting plane.

The lines 105A and B may be unwound from the spool 123, without removing the spool 123 from the body 104, by drawing them out of their respective windows 107A and B, since the lower flange 125 of the spool 123 is stiff but resilient. The upper flange 125 of the spool 123 is preferably provided with one or more knobs 127-128 for engagement in apertures in the upper side of the body 104, thus preventing rotation of the spool 123 within and independently of the body 104.

It is a particular feature of both embodiments of this invention, as hereinbefore explained, that provision is taken to distribute stress in the cutting lines over as great a length as possible, and this is done by providing that the portions of the lines enclosed within any part of the apparatus are located only adjacent straight or curvilinear surfaces. This is of particular importance insofar as the sidewall portions of the various windows are described, since it has been determined that these surfaces constitute the location of the greatest chance for such kinkage and stress fatigue.

Referring to FIGS. 1-6, it will be seen how the sidewalls 65 of the various windows 70A-D have curvilinear surfaces having substantial radii for this reason, and in FIGS. 7-9 the sidewalls 131 and 132 are similarly curved. However, it is of significance that it is the sidewall surface 132A–B which trails the cutting lines 105A–B, which is most important in this regard.

Figure 10:
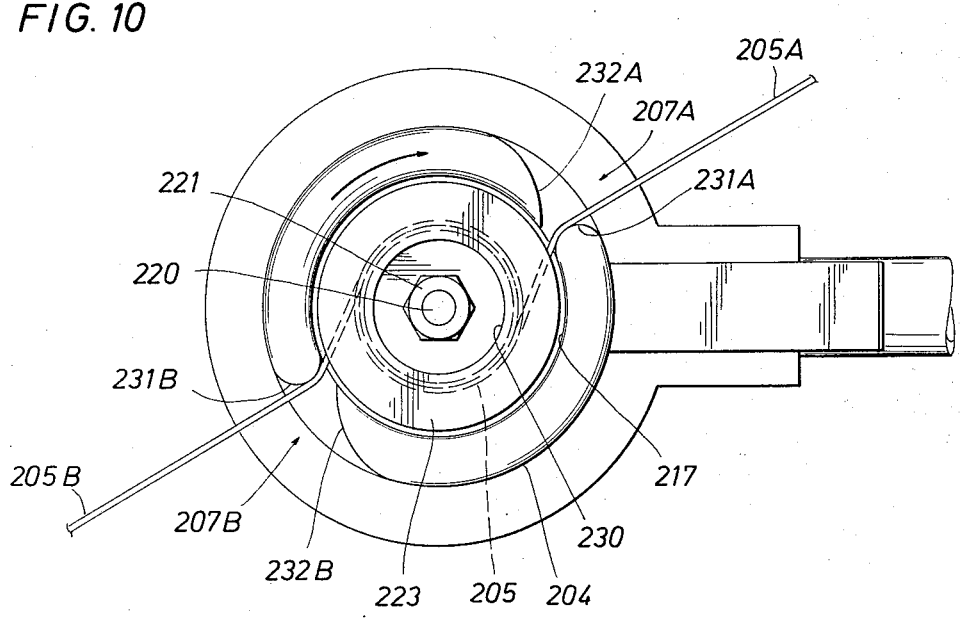
FIG. 10 is a similar view of the apparatus depicted in FIG. 9 but depicting a head assembly of different configuration.
Figure 11:
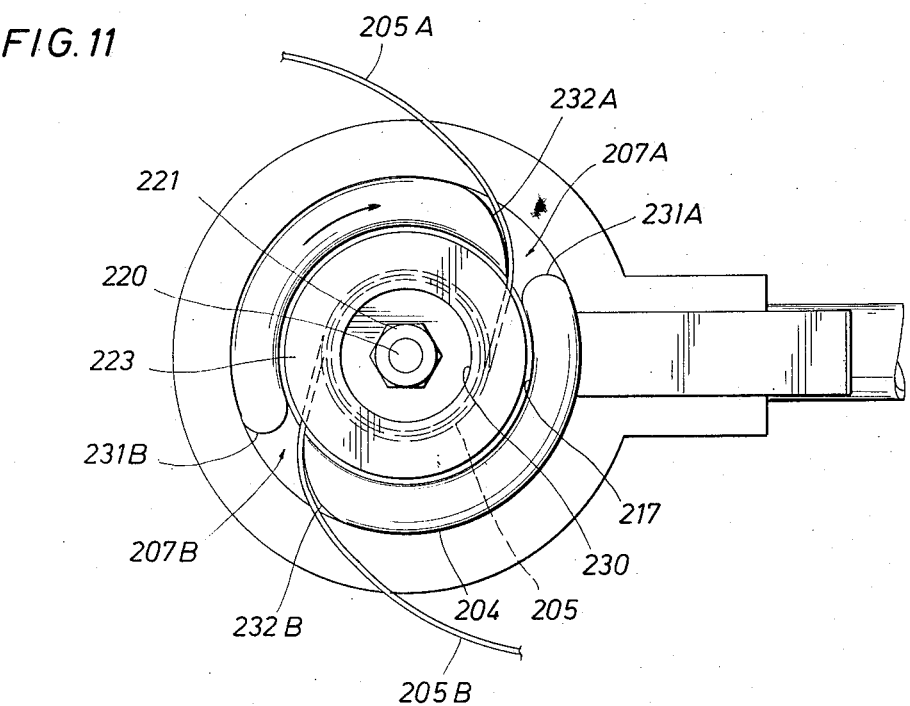
FIG. 11 is another view of the same apparatus depicted in FIG. 10.

Referring now to FIG. 10, there may be seen a simplified pictorial representation of a modified version of the apparatus depicted in FIG. 7–9, wherein the lines 205A–B are wound about a spool 223 in the same manner as hereinbefore described. The spool 223 is similarly mounted in the receptacle space 217 in the body 204, and similarly fastened to a motor shaft 220 by a lock nut 221, and the lines 205A–B similarly separate and extend outwardly of the body 204 through windows 207A and B in the wall of the body 204. The significant difference between the body 204 in FIG. 10, and the body 104 in FIGS. 8–9, will be readily seen to be the fact that the leading sidewall surfaces 231A–B have a conventional radius of curvature, whereas the trailing sidewalls 232A–B have a much greater radius of curvature. Accordingly, it may be seen in FIG. 11, that the lines 205A–B are whipped or snapped back about the periphery of the body 204, this greater radius of curvature produces a corresponding curvature in the lines 205A–B, thereby more evenly distributing the impact along the lines 205A–B and thus minimizing the chances of breakage.

It has been determined that, for the embodiment of the invention depicted in FIGS. 1–6, the optimum parameters will call for nylon lines having diameters of not substantially less than 0.035 inches nor substantially more than 0.100 inches, an rpm of between 2500–4000, and a cutting length (the length extending beyond the periphery of the cutting head) of substantially 5–9 inches. In a two-strand embodiment such as is depicted in FIGS. 7–11, the preferred driving means will be a non-synchronous electric motor capable of maintaining an rpm rate of 3,500–7,000 during normal use of the equipment.

In a more precise relationship, the optimum rpm is preferably stated in terms of tip velocity (since it is the terminal inch of each line that is effective for present purposes), and may thus be stated as follows:

$$V_{min} = 5,600/ \sqrt[3]{d} \quad \text{or} \quad 5,600/d^{0.331}$$

and $$V_{max} = 21,000/ \sqrt[16]{d} \quad \text{or} \quad 21,000/d^{0.063}$$

wherein V is the tip velocity of the cutting lines in feet per minute, and d is the cross sectional diameter, in inches, of a monofilament extruded nylon line.

Accordingly, if the line has a diameter of 0.035 inches, the minimum tip velocity should not be less than 17,000 feet per minute, and the maximum velocity should not exceed 26,000 feet per minute. If the line diameter is 0.065 inches, the tip velocities will preferably be between 14,000–25,000 feet per minute, and if the line diameter is 0.100 inches, the tip velocity will be between 12,000–23,000 feet per minute.

As hereinbefore mentioned, the cutting effectiveness is a function of the weight of the lines as well as their tip velocity, and thus it has been determined that in a preferred embodiment of the present invention as depicted in FIGS. 7–11, the lines will be formed of a material having a specific gravity of not substantially less than 0.90 nor substantially greater than 1.60. Since cutting is effected by substantially only the last inch of each line, it may be stated that the lines should be a dimension such that each line has a kinetic energy of not substantially less than 0.03 foot-lbs., nor substantially more than 7.14 foot-lbs., when the equipment is in operation.

It has further been determined that the extended length of the cutting lines is also a direct function of the size of the cutting head, although the precise explanation for this is not immediately apparent. In any event, it can be stated that this provides that the cutting lines should have a free traveling or unsupported length of not substantially less than 0.50 times the diameter of the cutting head, nor substantially more than 2.2 times such diameter, and this appears to be especially significant in the operation of the embodiment of the invention depicted in FIGS. 7–11.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings, are exemplary only and are not intended as limitations in the scope of the present invention.

What is claimed is:

1. Apparatus for cutting vegetation and the like comprising a rotary member rotatable in a cutting plane about an axis, a flexible non-metallic line means having a first secured portion interconnected with said rotary member and having a second free traveling end portion extending from a point on said rotary member spaced in said cutting plane from said axis, said line means having a cross sectional diameter substantially at least 0.025 inches and not substantially greater than 0.100 inches, and driving means for rotating said rotary member about said axis at a rotation velocity such that the tip velocity of said free traveling end portion of said line means is at least $5,600/\sqrt[3]{d}$ feet per second, where $d$ is the cross sectional diameter in inches of said line means.

2. The apparatus described in claim 1, wherein said line means also includes a second secured portion interconnected with said rotary member and a second free traveling end portion extending a second point on said rotary member spaced in said cutting plane from said axis.

3. Apparatus for cutting vegetation and the like, comprising a housing rotatable in a cutting plane and having at least one internal storage compartment and at least one wall aperture communicating therewith and defined by spaced-apart curvilinear side-wall surfaces aligned with the rotation axis of said housing, flexible non-metallic line means coiled within said compartment oppositely of the rotation of said housing and having a free-traveling end portion extending respectively through said wall aperture an unsupported distance functionally related to the cross sectional diameter of said line means, and driving means for revolving said housing and line means about said axis at a rotation velocity imparting a preselected tip energy to said line means, said rotation velocity further being substantially such that the tip velocity of said free traveling end portion of said line means is at least $5600/3\sqrt[3]{d}$ feet per second and not greater than 21,000/$\sqrt[3]{d}$ feet per second, where d is the cross sectional diameter in inches of said line member.

4. The apparatus described in claim 3, wherein said free traveling end portion of said line means extends from said housing an unsupported distance greater than at least five inches and not substantially greater than nine inches in length.

5. The apparatus described in claim 4, wherein said line means has at least four separated free traveling end portions each extending from one of a corresponding plurality of locations equally spaced about the periphery of said housing and laterally in said cutting plane, and wherein said driving means is a gasoline-driven engine adapted to revolve said housing at a rotational velocity of not less than 2,500 revolutions per minute and not greater than 4,000 revolutions per minute during intersection of vegetation and the like by said four end portions of said line means.

6. The apparatus described in claim 5, wherein said housing comprises a rotary body fixedly attachable concentrically to the shaft of said engine and having four internal circular compartments spaced about said engine shaft and each communicating separately with one of four equally spaced apart window apertures each defined by curvilinear wall portions of the periphery of said body, said compartments in said rotary body also each communicating with one of four non-circular apertures equally spaced about said engine shaft and between said shaft and the periphery of said body, four separate spool-like members each removably disposed in one of said circular compartments in said body and each having circular upper and lower flange portions rotatable in said compartments and a non circular knob-like portion protruding from said upper flange portion and insertable in the corresponding one of said non-circular apertures in said body, four separate non-metallic line members each having one end secured to and wound about one of said spool members and having its other end extending from the respective compartment through the corresponding one of said window apertures and radially outwardly of the periphery of said body, a cup member detachably fastened to said rotary body for forming with said body a rotatable housing assembly enclosing said spool members in said compartments, and four separate spring members mounted in said cup member and yieldably thrusting said non-circular knob-like portions of said spool members insertably into and through said non-circular apertures in said body.

7. The apparatus described in claim 4, wherein said line means has a pair of separated free traveling end portions each extending from one of a pair of equally spaced apart locations on opposite sides of the periphery of said housing and laterally in said cutting plane, and wherein said driving means is a non-synchronous electric motor adapted to revolve said housing at a rotational velocity of not less than 3,500 revolutions per minute and not greater than 7,000 revolutions per minute during intersection of vegetation and the like by said pair of end portions of said line means.

8. The apparatus described in claim 7, wherein the cross sectional diameter of said line means is substantially 0.035 inches and said tip velocity is greater than 17,000 feet per minute but not greater than 26,000 feet per minute.

9. The apparatus described in claim 7, wherein the cross sectional diameter of said line means is substantially 0.065 inches and said tip velocity is greater than 14,000 feet per minute but not greater than 25,000 feet per minute.

10. The apparatus described in claim 7, wherein the cross sectional diameter of said line means is substantially 0.100 inches and said tip velocity is greater than 12,000 feet per minute but not greater than 23,000 feet per minute.

11. As a sub-assembly in apparatus for cutting vegetation and the like, means comprising a rotary housing rotatable about a concentric axis and having four internal circular compartments spaced about a concentric axis and each communicating separately with one of four equally spaced apart window apertures each defined by curvilinear wall portions of the periphery of said housing, said compartments in said rotary housing also each communicating with one of four non-circular apertures equally spaced about said axis and between said axis and the periphery of said housing, four separate spool-like members each removably disposed in one of said circular compartments in said housing and each having circular upper and lower flange portions rotatable in said compartments and a non circular knob-like portion protruding from said upper flange portion and insertable in the corresponding one of said non-circular apertures in said housing, four separate non-metallic line members each having one end secured to and wound about one of said spool members and having its other end extending from the respective compartment through the corresponding one of said window apertures and radially outwardly of the periphery of said housing, a cup member detachably fastened to said rotary housing for forming with said housing a rotatable housing assembly enclosing said spool members in said compartments, and four separate spring members mounted in said cup member and yieldably thrusting said non-circular knob-like portions of said spool members insertably into and through said non-circular apertures in said housing.

* * * * *

UNITED STATES PATENT OFFICE
CERTIFICATE OF CORRECTION

Patent No. 3,826,068                    Dated July 30, 1974

Inventor(s)   George C. Ballas and Thomas N. Geist

It is certified that error appears in the above-identified patent and that said Letters Patent are hereby corrected as shown below:

Col. 12, line 68 (claim 3), "$5600/3\sqrt[3]{d}$" should read -- $5600/\sqrt[3]{d}$ --;

Col. 13, line 1, "$21,000/\sqrt[3]{d}$" should read -- $21,000/\sqrt[6]{d}$ --

Signed and sealed this 8th day of October 1974.

(SEAL)
Attest:

McCOY M. GIBSON JR.                    C. MARSHALL DANN
Attesting Officer                      Commissioner of Patents

UNITED STATES PATENT OFFICE
CERTIFICATE OF CORRECTION

Patent No. 3,826,068                    Dated- July 30, 1974

Inventor(s) George C. Ballas et al.

It is certified that error appears in the above-identified patent and that said Letters Patent are hereby corrected as shown below:

The term of this patent subsequent to

January 9, 1990, has been disclaimed.

Signed and Sealed this

[SEAL]

tenth Day of February 1976

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,826,068                    Dated   July 30, 1974

Inventor(s)  George C. Ballas and Thomas N. Geist

It is certified that error appears in the above-identified patent and that said Letters Patent are hereby corrected as shown below:

Column 12, line 39, "second" should read --minute--

Column 13, lines 1 and 2, "second" should read --minute--

Col. 12, line 34, (Claim 1), "0.025 inches" should read --0.035 inches--.

Signed and Sealed this

Fifteenth Day of February 1977

[SEAL]

Attest:

RUTH C. MASON  
*Attesting Officer*

C. MARSHALL DANN  
*Commissioner of Patents and Trademarks*